US009911202B2

United States Patent
Frey et al.

(10) Patent No.: US 9,911,202 B2
(45) Date of Patent: Mar. 6, 2018

(54) VISUAL SALIENCE OF ONLINE VIDEO AS A PREDICTOR OF SUCCESS

(71) Applicant: Disney Enterprises, Inc., Burbank, CA (US)

(72) Inventors: Seth Frey, Zurich (CH); Anthony M. Accardo, Glendale, CA (US); Robert Sumner, Zurich (CH); Rafael Huber, Zurich (CH); Alexandre Chapiro, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 203 days.

(21) Appl. No.: 14/834,222

(22) Filed: Aug. 24, 2015

(65) Prior Publication Data

US 2017/0061235 A1  Mar. 2, 2017

(51) Int. Cl.

| | |
|---|---|
| *G06K 9/00* | (2006.01) |
| *G06T 7/00* | (2017.01) |
| *H04N 19/00* | (2014.01) |
| *G06T 7/60* | (2017.01) |
| *H04N 19/17* | (2014.01) |
| *H04N 19/154* | (2014.01) |
| *G06K 9/46* | (2006.01) |

(52) U.S. Cl.
CPC ............ *G06T 7/60* (2013.01); *G06K 9/00335* (2013.01); *G06K 9/00718* (2013.01); *G06K 9/4628* (2013.01); *H04N 19/154* (2014.11); *H04N 19/17* (2014.11)

(58) Field of Classification Search
None
See application file for complete search history.

(56) References Cited

U.S. PATENT DOCUMENTS

| | | | | |
|---|---|---|---|---|
| 2011/0255589 A1* | 10/2011 | Saunders | ............. | H04N 19/176 375/240.01 |
| 2013/0063561 A1* | 3/2013 | Stephan | ............. | H04N 13/0402 348/46 |
| 2013/0142418 A1* | 6/2013 | Van Zwol | .......... | G06K 9/00751 382/159 |
| 2015/0363635 A1* | 12/2015 | Suri | ................... | G06K 9/00268 386/241 |

OTHER PUBLICATIONS

Hugo Boujut, Jenny Benois-Pineau, Toufik Ahmed, Ofer Hadar, Patrick Bonnet. "No-ReferenceVideo quality assessment of H.264 video streams based on semantic saliency maps." IS&T /SPIE Electronic Imaging, Jan. 2012, San Francisco, United States. 8293, pp. 8293-28.*

* cited by examiner

Primary Examiner — Utpal Shah
(74) Attorney, Agent, or Firm — Patterson + Sheridan, LLP (57) ABSTRACT

Systems, methods, and computer program products to perform an operation comprising computing a saliency value for a video based on saliency values a set of pixels in each frame of the video, computing, for the video, an expected value for a metric by a predictive algorithm based on the saliency value for the video, and outputting the expected value for the metric as an indication of an expected outcome for the metric achieved by the video.

20 Claims, 6 Drawing Sheets

FIG. 1A

| SUMMARY STATIC 111 | t 112 | HIGH SALIENCE 113 | | LOW SALIENCE 114 | | HAZARD RATIO 119 |
|---|---|---|---|---|---|---|
| | | S(t) 115 | CI₉₉% 116 | S(t) 117 | CI₉₉% 118 | |
| MEAN | 0.01 | .934 | [.929, .939] | .935 | [.932, .939] | 0.98 |
| | 0.05 | .759 | [.751, .767] | .729 | [.723, .734] | 1.12 |
| | 0.10 | .652 | [.643, .661] | .587 | [.581, .594] | 1.19 |
| | 0.15 | .599 | [.590, .609] | .511 | [.504, .517] | 1.22 |
| | 0.25 | .545 | [.536, .555] | .420 | [.413, .426] | 1.27 |
| | 0.50 | .482 | [.472, .491] | .329 | [.323, .335] | 1.30 |
| | 0.75 | .452 | [.443, .462] | .292 | [.286, .298] | 1.29 |
| | 1.00 | .386 | [.376, .395] | .227 | [.221, .232] | 1.26 |
| STANDARD DEVIATION | 0.01 | .943 | [.939, .946] | .924 | [.919, .928] | 1.33 |
| | 0.05 | .749 | [.743, .755] | .723 | [.715, .730] | 1.10 |
| | 0.10 | .623 | [.616, .630] | .586 | [.578, .595] | 1.10 |
| | 0.15 | .553 | [.546, .560] | .518 | [.510, .527] | 1.08 |
| | 0.25 | .470 | [.463, .477] | .445 | [.436, .453] | 1.05 |
| | 0.50 | .382 | [.375, .389] | .373 | [.364, .381] | 1.01 |
| | 0.75 | .345 | [.338, .351] | .342 | [.334, .350] | 1.00 |
| | 1.00 | .273 | [.267, .279] | .285 | [.277, .292] | 0.98 |

VISUAL SALIENCE OF ONLINE VIDEO AS A PREDICTOR OF SUCCESS

BACKGROUND

Field of the Invention

Embodiments disclosed herein relate to computer software. More specifically, embodiments disclosed herein relate to computer software that uses visual salience of a video as a predictor of success of the video.

Description of the Related Art

Producers of video content need analytics that can predict the success of a video before it has been released. Traditionally, predictions for feature films have been based on aspects surrounding the video, such as the video's genre, budget, the popularity of starring actors, critical reviews, and the like. Recently, social media content and other Internet sources have been leveraged to predict success. Many of these factors are subjective measures that potentially bias the results. For example, when relying on box office sales as a success measure, the results strongly depend on the chosen time window (such as first weeks, cumulative period in a theater, theater and video sales, etc.). Further still, available prediction models focus on full-length feature films, and are therefore of limited value when predicting the success of shorter videos such as commercials, trailers, and other content that is becoming prevalent on various streaming websites. However, computational measures of video assets themselves can serve as useful predictors. Specifically, computational models of human visual attention have not been applied to predict video success.

SUMMARY

Embodiments disclosed herein provide systems, methods, and computer program products to perform an operation comprising computing a saliency value for a video based on saliency values for a set of pixels in each frame of the video, computing, for the video, an expected value for a metric by a predictive algorithm based on the saliency value for the video, and outputting the expected value for the metric as an indication of an expected outcome for the metric achieved by the video.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein leverage the saliency of a video to determine the success of the video relative to any type of success metric. Salience refers to the state or quality by which an object (such as a pixel, frame, or video) stands out relative to other similar objects. Generally, embodiments disclosed herein compute a saliency value for a video based on saliency values of the pixels in each video frame and/or on saliency values for each video frame. The saliency value for the video may then be provided as input to a predictive algorithm which considers the saliency as a factor when predicting a measure of success of the video. Generally, the predictive algorithms treat videos having higher saliency values as being more likely to be successful (relative to metrics) than videos having lower saliency values. Doing so may allow users to modify their videos to be more salient prior to distribution if, for example, the predicted values for the success metric are lower than desired.

For example, a user may provide a video as part of a request to predict how many times the video is likely to be viewed by the general public. In response, embodiments disclosed herein may compute a saliency value for the video based on the pixels and/or frames of the video. The saliency value may then be provided as input to a predictive algorithm that may compute an expected number of views for the video. The expected number of views may be relative to an average number of views for all videos. Generally, the saliency of the video may be used to predict any attribute of a video, such as number of ad clicks, survival rates of video viewers, a number of likes the video will receive, a number of users that will watch a different video promoted by the video (such as for movie trailers, television promotions, etc.), an amount of advertising revenue the video will generate, and the like.

Figure 1A:
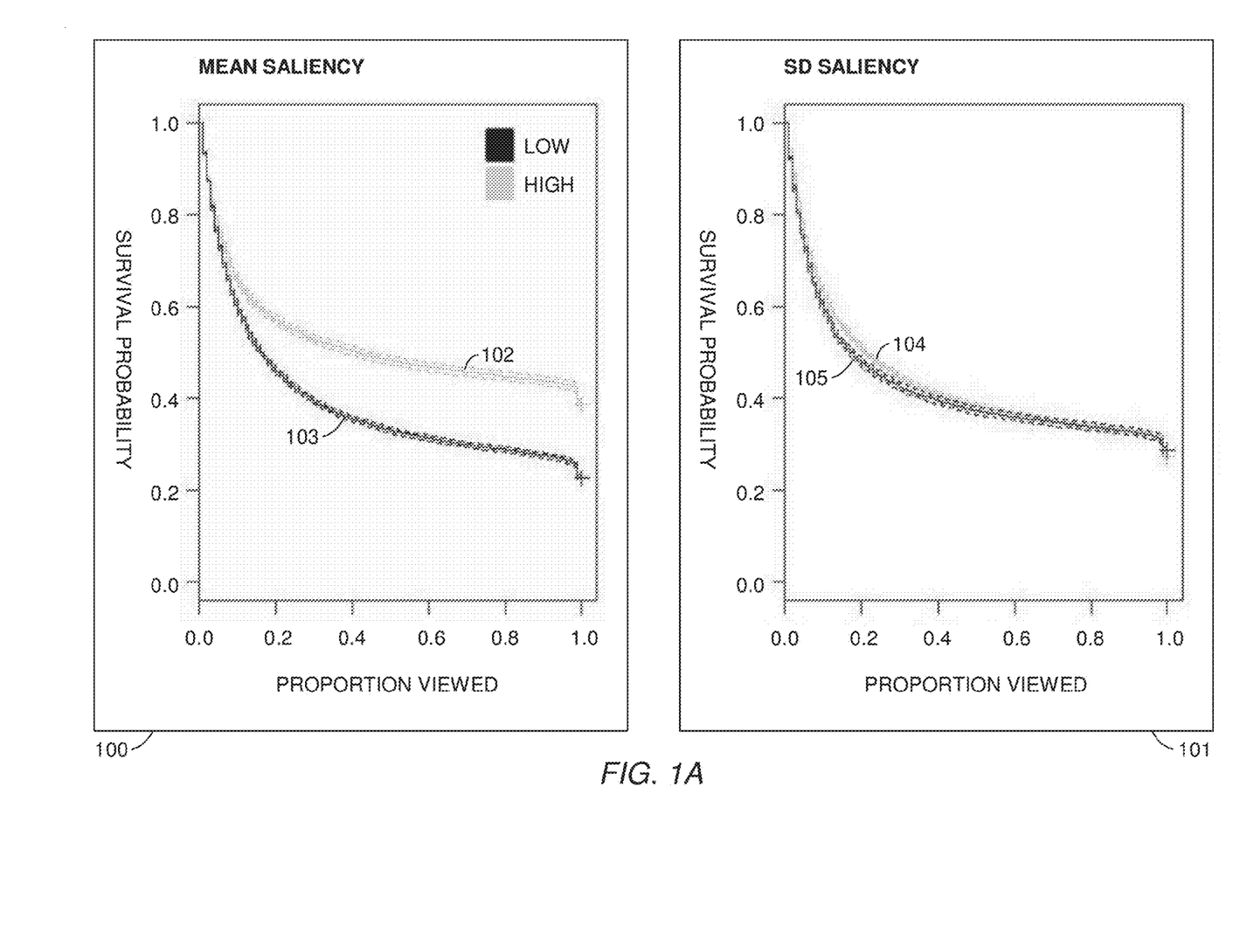
FIGS. 1A-1B depict example outputs generated by using video salience as a predictor of success, according to one embodiment

FIG. 1A depicts two example output graphs 100, 101 generated by using saliency as a predictor of success for a video, according to one embodiment. To produce output graphs 100, 101, a user may submit one or more videos as part of a request to predict the video's likelihood of success relative to a given metric. The user may further specify the particular success metric as part of the request. For example, the user may request a prediction as to the number of views the video may receive. In the examples depicted in FIGS. 1A-1B, the success metric is a survival probability, which is the probability that a user will stop watching a video. A prediction system implementing embodiments of the disclosure may compute the saliency of the video, and use the saliency of the video to predict a likelihood of success for the video along the requested metric.

As shown, the graph 100 is based on a mean saliency for the input video, while the graph 101 is based on a standard deviation saliency for the input video. The prediction system may compute the mean and standard deviation saliencies of the video by computing a saliency value for each pixel in each frame of the video. The saliency value for each pixel may be computed using any saliency algorithm, such as the Itti, Koch, and Niebur algorithm (the IKN algorithm), which computes pixel saliency values based on color, intensity, and orientation of the pixel (or groups of pixels). Once the pixel saliency values are computed, the prediction system may optionally compute per-frame saliency values, which may be based on the saliency values of each pixel and/or additional features of the frames, such as whether text is in the frame, or faces are present in the frame, the proximity of features to the center of the image, whether features are in motion, whether objects are determined to exist in the foreground (rather than the background) of an image, whether an object is occluded by other objects, and the size of a region of pixels. Generally, computational saliency models can be trained, using machine learning methods, from human eye gaze data, to determine what attracts the attention of people in experiments. In such cases, saliency can be defined in behavioral terms of what actually grabs the attention of viewers. The prediction system may then compute the mean saliency value for the video by computing the mean saliency value across all pixels (optionally including per-frame saliency values). The prediction system may then compute the standard deviation saliency for the video by computing the standard deviation of the pixel (and optionally the per-frame) saliency values. Generally, saliency values may be a single number, or a vector of multiple numbers.

The prediction system may then compute the survival probabilities (or hazard rate) for the video by providing the saliency value to a predictive algorithm. For example, the predictive algorithm may compute the survival probabilities as a function of the proportion of the video viewed and the saliency of the video. The predictive algorithm may approximate the survival function S(t), which may be defined as the probability of a user's "survival" T exceeding time t, where S(t)=P(T>t). The survival function S(t) may be based on an empirical approximation known as a Kaplan-Meier (KM) method. The KM method may be configured by defining "stop watching a video" as the event of interest, and the percentage p=[0,1] of a video watched until an event (such as closing the video, loading another video, clicking an ad, etc.) occurred as the time of survival. In one embodiment, stopping at p=1 is treated as right-censored in the analysis, as it may represent either successfully completing the video or a dropout that occurs at the very last second of the video.

The KM method of survival analysis may require categorical predictors. Therefore, as shown, two videos (or two groups of videos) may be considered, namely a first video (or first group of videos) that has high saliency, and a second video (or second group of videos) that has low saliency relative to a median saliency for a library of known videos. The first and second videos may be the same video, in that the same video is edited or refined to have different saliency measures. The prediction system may then estimate the survival probabilities for the first and second videos.

As shown, the graph 100 includes a line 102 for a high-saliency video and a line 103 for a low-saliency video. The lines 102, 103 show the output of the survival function S(t), namely the predicted rates by which viewers drop out of videos. Similarly, the graph 101 reflects the output of the survival function S(t), represented by line 104 for a high-saliency video and a line 105 for a low-saliency video. The x-axes of the graphs 100, 101 represent the percentage of the video watched. The y-axes of the graphs 100, 101 reflect the probability that a user will stop watching a video. An (x, y)-coordinate of a point on the graphs 100, 101 reflect the predicted dropout rates at a given point in the video. Therefore, the graph 100 reflects the dropout rates in the sense that all viewers completed 0% of either video, while line 102 reflects approximately 20% of viewers can be expected to complete the low-saliency video, while line 103 reflects that approximately 40% of viewers can be expected to complete the high-saliency video. Each curve 104, 105 shows, for a given percentage of a video, a prediction as to the dropout rate for each video.

Figure 1B:
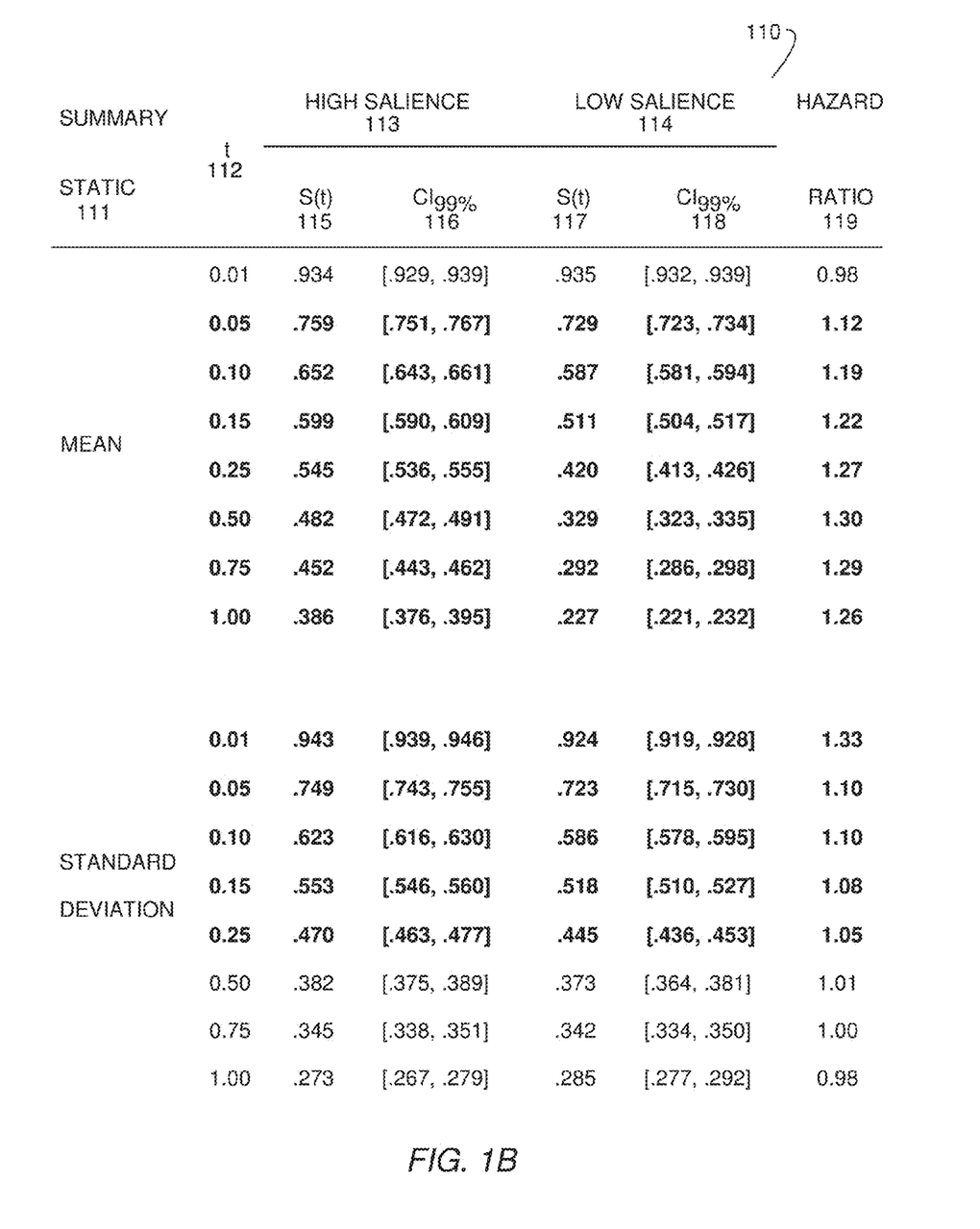

FIG. 1B depicts a table 110 that predicts survival probabilities for a high-salience video 113 and a low-salience video 114 at specific points in time of each video. In at least one embodiment, the table 110 is a more detailed presentation of the data reported in graphs 100, 101. As shown, the table 110 defines a summary statistic 111, which as described above, may be a saliency value for a video computed based on a mean of all pixel (and/or per-frame) saliency values for the video, or a saliency value for a video computed based on the standard deviation of all pixel (and/or per-frame) saliency values for the video. The t column 112 is a specific point in a video, such as a percentage of the video (but may be configured to reflect a time (e.g., in seconds) in the video). As shown, the table 110 includes a column 115 for the survival function S(t) for the high saliency video 113 and a column 116 for the 99% confidence interval of the high saliency video 113. For example, at t=0.05, the output of the survival function S(t) is 0.759, reflecting a 75.9% probability that a user will continue watching the high saliency video 113 video when the user has watched 5% of the video. Similarly, the table 110 includes a column 117 for the survival function S(t) 115 for the low saliency video 114 and a column 118 for the 99% confidence interval of the low saliency video 114. For example, at t=0.05, the output of the survival function S(t) 117 is 0.729, reflecting a 72.9% probability that a user will continue watching the low saliency video 114 video when the user has watched 5% of the video. Therefore, the table 110 reflects that higher saliency videos are more likely to be watched to completion by a user than lower saliency videos. The hazard ratio 119 reflects a comparison between the predictions in columns 115 and 117. For example, a hazard ratio of 1.12, the second value in column 119, may be calculated from corresponding values in columns 115 and 117 (such that (1−0.729)/(1−0.759)=1.12), communicates that at the point that a user has watched 5% of the video, a viewer in the low salience category is 12% (1.12 times) more likely to drop out. Model comparisons like the hazard ratio can be analyzed to establish the statistical significance of the reported differences between comparable survival probabilities like those reported in columns 115 and 117. Generally, bold values in column 119 reflect values that passed a test of statistical significance. For example, the ratio of 1.12 represents a real difference between columns 115 and 117, and not a spurious one that emerges from inevitable sources of variability like measurement noise.

FIGS. 1A-1B depict example outputs showing the aggregated differences of predictions for many videos determined to have a high salience or a low salience. However, a user may provide a single video to the prediction system, which may generate an output only for that video. Therefore, the graphs 100, 101 of FIG. 1A would reflect a single line for the input video. Similarly, the table 110 of FIG. 1B would reflect a single output of the survival function S(t) and confidence interval for the input video.

Figure 2:
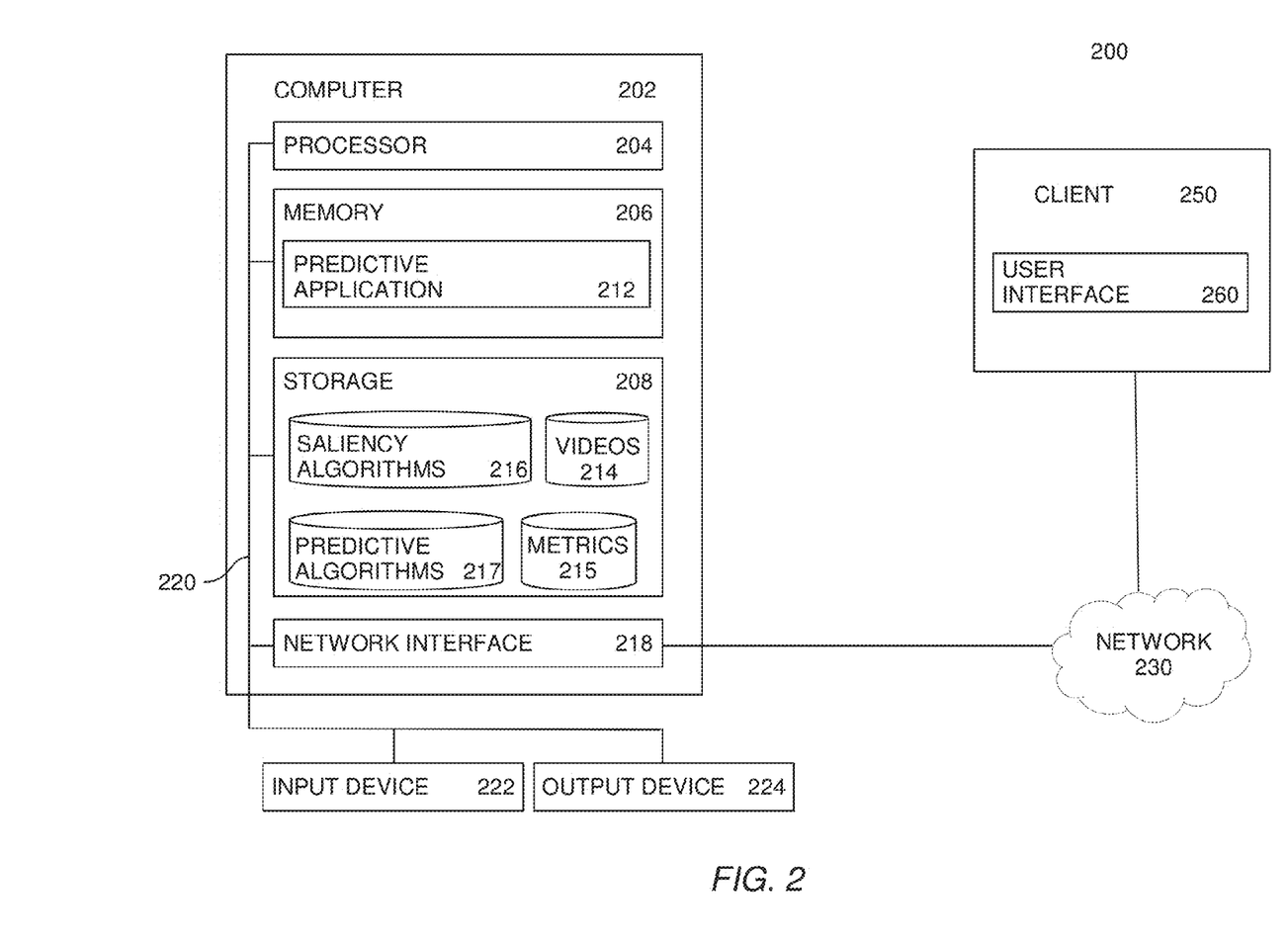
FIG. 2 is a block diagram illustrating a system that is configured to use visual salience of a video as a predictor of success, according to one embodiment.

FIG. 2 is a block diagram illustrating a system 200 that is configured to use visual salience of a video as a predictor of success, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 which obtains instructions and data via a bus 220 from a memory 206 and/or a storage 208. The computer 202 may also include one or more network interface devices 218, input devices 222, and output devices 224 connected to the bus 220. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the computer 202 to communicate with other computers via the network 230.

The storage 208 is representative of hard-disk drives, solid state drives, flash memory devices, optical media and the like. Generally, the storage 208 stores application programs and data for use by the computer 202. In addition, the memory 206 and the storage 208 may be considered to include memory physically located elsewhere; for example, on another computer coupled to the computer 202 via the bus 220.

The input device 222 may be any device for providing input to the computer 202. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the computer 202. The output device 224 may include output devices such as monitors, touch screen displays, and so on.

As shown, the memory 206 contains the predictive application 212, which is generally configured to compute a saliency value for a video and compute expected metric values for the video based on the saliency value for the video. To compute a saliency value for the video, the predictive application 212 may apply an algorithm from the saliency algorithms 216 to compute a saliency value for a set of pixels of each frame of the video. The set of pixels may be a group of pixels in the frame, each pixel in the frame, or a region of pixels in the frame. The predictive application 212 may then compute a saliency value for each frame of the video based on an algorithm from the saliency algorithms 216 based on the computed saliency values for the sets of pixels in each frame. The predictive application 212 may then use the saliency values for the sets of pixels and the frames to compute the saliency value for the video. The predictive application 212 may then provide the computed saliency value for the video as input to an algorithm from the predictive algorithms 217. The predictive application 212 may then use the predictive algorithm 217 to compute an expected value for the video based on the saliency value, where the expected value is relative to a performance metric, such as expected number of views of the video, shares of the video, etc. In at least one embodiment, the predictive application 212 is configured to only analyze videos that have a duration that is less than a threshold time duration. For example, the threshold time duration may be 4 minutes, 30 seconds. If a video provided as input by a user is 5 minutes in length, the predictive application 212 may return an indication that the video is too long for predictive analysis based on saliency. If, however, the predictive application 212 determines that the video is less than 3 minutes, 30 seconds in length, the predictive application 212 may analyze the video to determine the video's likelihood of success based on the saliency value of the video.

As shown, the storage 208 contains the videos 214, metrics 215, saliency algorithms 216, and predictive algorithms 217. The videos 214 include videos provided by users via the user interface 260 on a client computer 250. The users may provide a link to the video, such as a uniform resource locator (URL), or the users may upload the video directly. The metrics 215 include input metrics provided to predictive algorithms 217 and output metrics generated by the predictive algorithms 217. For example, the metrics 215 include input metrics comprising historical data describing user actions/behaviors relative to videos, such as the videos 214. For example, the metrics 215 may specify, for each video in the videos 214, the number of times the video was viewed, number of times users "liked" the video, a number of times a user clicked on an ad in the video, a number of times the user watched a related video being promoted by the video, and the like. Furthermore, the metrics 215 may include attributes of videos 214 themselves, such as the presence of a "star actor," length of the video, a genre of the video, or known ratings/reviews of the videos. Some metrics 215 may be both input and output metrics. In such embodiments, the input metrics are historical data (for example, metrics 215 reflecting a number of times a video was previously viewed), and the output metrics reflect predicted future values for those metrics. In addition, the saliency values for each video may be stored in the metrics 215. The predictive application 212 may also store estimated or predicted metric values for a given video in the metrics 215. For example, if the application 212 predicts that a given video should expect to reach 1,000,000 views based on the saliency of the video, the predictive application 212 may store an indication of the estimated number of views and the computed saliency in a record for the given video in the metrics 215.

The saliency algorithms 216 compute saliency values for pixels in a video frame (or image), frames of a video, and the entire video. An overall saliency value may quantify the degree to which the video draws attention relative to other videos. An example of a saliency algorithm 216 is the IKN algorithm, which computes saliency values for pixels (or groups of pixels) based on color, intensity, of the pixel, or orientation of features in pixels. Generally, however, any algorithm that computes a saliency value for a pixel, group of pixels, frame, or video may be stored in the saliency algorithms 216. The predictive algorithms 217 include any type of algorithm that takes a saliency value of a video as input and produces an output of an expected value for a performance metric. Examples of predictive algorithms 217 include survival functions (such as Kaplan-Meier survival functions), hazard functions, linear regressions, multiple regressions, and machine learning models.

Furthermore, the predictive application 212 may compute saliency values for a given image, or a sequence of images. The predictive application 212 may compute a saliency value for one or more sets of pixels in the image. The predictive application 212 may then compute a saliency value for the image based on the saliency values for the sets of pixels. The predictive application 212 may then provide the saliency value for the image to a predictive algorithm 217, which may compute an expected value for the image based on the saliency value of the image, where the expected value is relative to a performance metric. Therefore, use of a video as a reference example herein should not be considered limiting of the disclosure, as the disclosure applies equally to images or sequences of images.

For example, a user may provide two images as input to the predictive application 212. The images may differ in how two people are oriented in the image (for example, person X is on the left in one image and on the right in the other image). The predictive application 212 may then compute saliency values sets of pixels in the images, as well as saliency values for the images themselves. The predictive application 212 may then provide the saliency values to a predictive algorithm 217, which computes a likelihood of success for each image relative to a given metric. By processing both images, the predictive application 212 may determine which orientation has a greater likelihood of success for the metric, and the user may choose one image over the other for publication.

Figure 3:
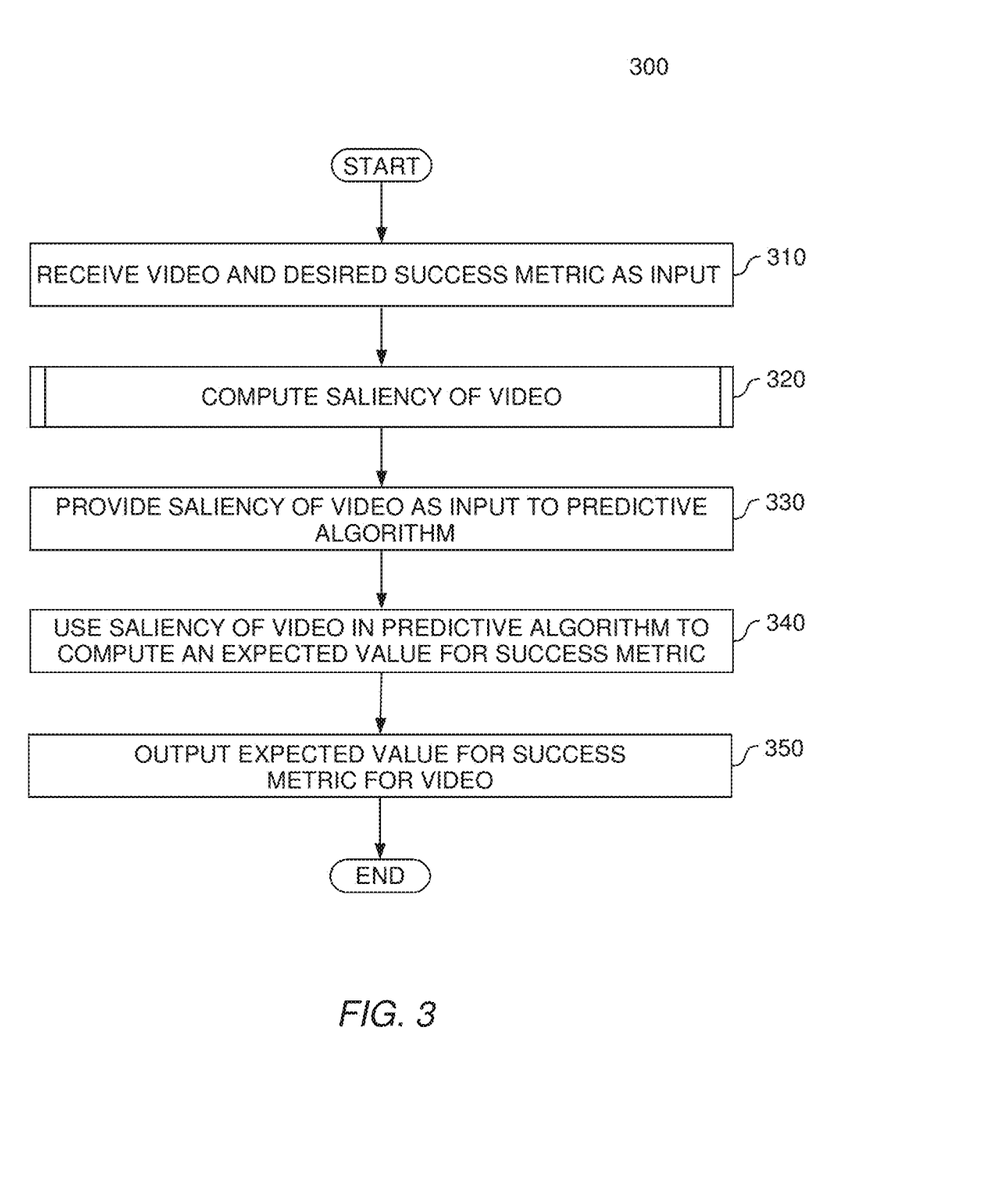
FIG. 3 is a flow chart illustrating a method to use visual salience of a video as a predictor of success, according to one embodiment.

FIG. 3 is a flow chart illustrating a method 300 to predict success of a video relative to a given metric based on a determination of visual salience, according to one embodiment. Generally, saliency is an objective measurement of each pixel, frame (or image), or video (or sequence of images). The method 300 may therefore use the saliency values as part of a predictive correlation between the salience of the video and success to a given metric. In at least one embodiment, the predictive application 212 performs the steps of the method 300 to compute an expected value of a performance metric for a video. For example, a user may request that the predictive application 212 compute an expected survival probability for each second of a video, where the survival probability reflects a probability that a given user will stop watching the video at each second.

As shown, the method 300 begins at step 310, where the predictive application 212 receives a video (or a link to the location of a video) from a user. The user may also specify a desired success metric that should be estimated by the predictive application 212. For example, the user may specify success measures such as an estimated number of views, an estimated number of shares, an estimated number of ad-clicks that the video may receive once published online, etc. At step 320, described in greater detail with reference to FIG. 4, the predictive application 212 computes the saliency of the video received as input. Generally, the predictive application 212 evaluates pixel values in each frame of the video to determine a saliency value for the video. The predictive application 212 may also consider per-frame saliency values when computing the saliency value for the video. The per-frame saliency values may be based on an average of the pixel saliency values computed for each frame. While saliency values may take any form, saliency values are often scalar values normalized to a range of 0.0 to 1.0.

At step 330, the predictive application 212 provides the saliency value of the video computed at step 320 as input to a predictive algorithm 217. At step 340, the predictive algorithm 217 uses the saliency of video to compute an expected value for the success metric specified by the user. For example, the predictive algorithm may predict how many views (in a given time period) are expected to occur based on the saliency of the video or determine a survival trajectory over the length of the video—predicting how likely it is a given viewer will stop viewing the video. An example insight resulting from invoking the predictive application may be that, on a range from 0.0 to 1.0, the higher the saliency value, the more "successful" a video is likely to be. Another example includes determining that for videos having some other property, saliency may predict an upside-down U-shape curve, so that videos with too much or too little salience are less successful than videos with the right amount of salience. At step 350, the predictive application 212 may output the expected value for the success metric specified by the user.

Figure 4:
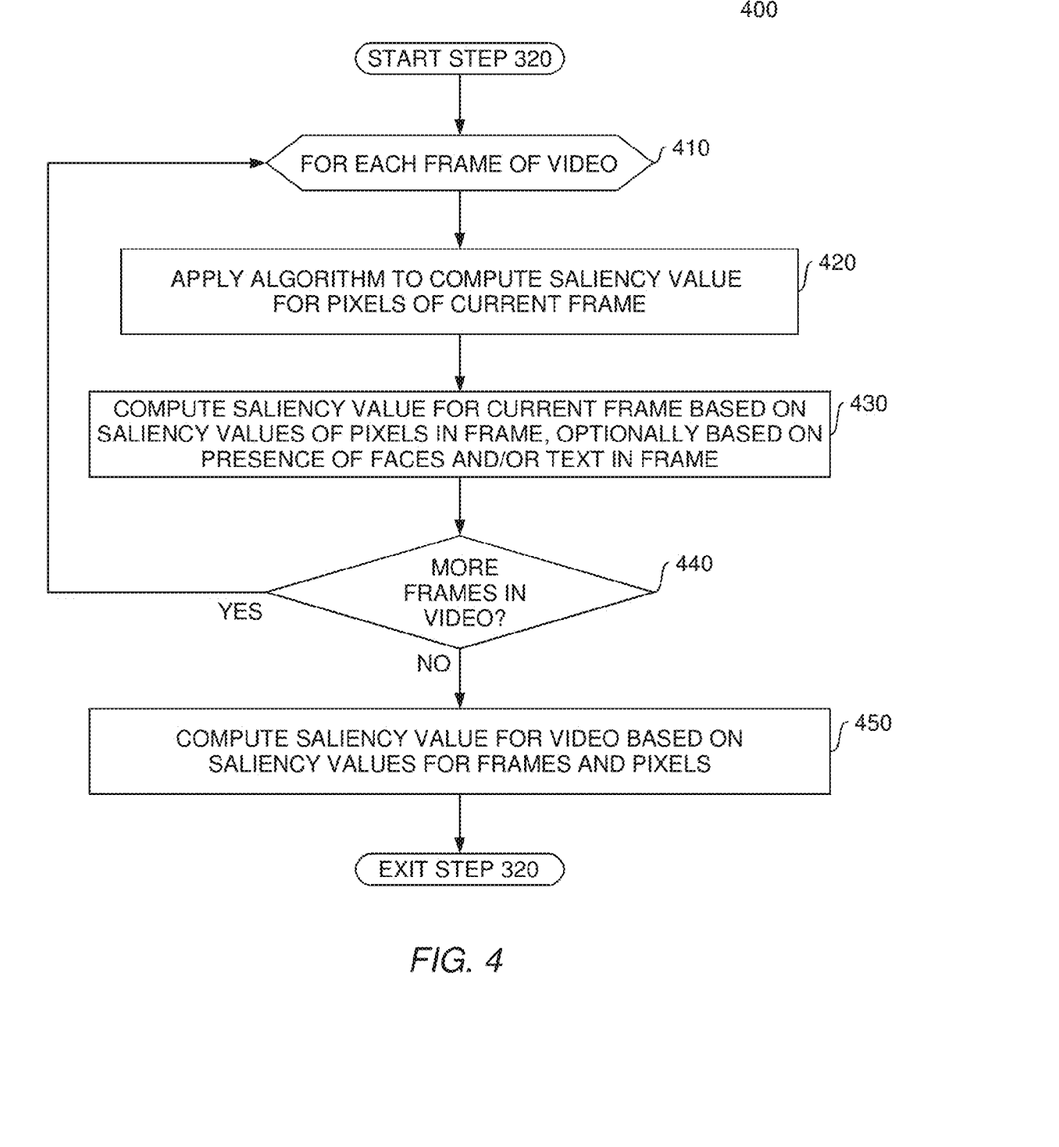
FIG. 4 is a flow chart illustrating a method to compute a saliency value for a video, according to one embodiment.

FIG. 4 is a flow chart illustrating a method to compute a saliency value for a video, according to one embodiment. In at least one embodiment, the predictive application 212 performs the steps of the method 400 to compute a single saliency value for a video. The saliency value may be a number and/or a vector of numbers. As shown, the method 400 begins at step 410, where the predictive application 212 executes a loop including steps 420-440 for each frame of the video received as input. At step 420, the predictive application 212 applies a saliency algorithm 216 to the compute saliency values for each pixel (or a set of pixels, such as a group of neighboring pixels) in the current frame. For example, the predictive application 212 may apply the IKN algorithm to compute a saliency value for one or more pixels in the frame based on the color, intensity, and orientation contrast of the pixel (or group of pixels) relative to other pixels (or other groups of pixels) in the frame. The IKN algorithm generally receives an image as input, and uses the pixels to compute a saliency value for at least a subset of pixels in the image or frame. At step 440, the predictive application 212 applies a saliency algorithm 216 to compute a saliency value for the current frame. In at least one aspect, the predictive application 212 may average the computed pixel saliency values in the current frame to compute an aggregate saliency value for the current frame. The predictive application 212 may also consider other features of the current frame when computing the saliency value for the current frame (or image), such as whether human faces are present in the frame, whether text is present in the current frame, and the like. At step 440, the predictive application 212 determines whether more frames remain in the video. If more frames remain, the method returns to step 410, where the predictive application 212 computes pixel saliency values and saliency values for the remaining frames. If no more frames remain in the video, the method 400 proceeds to step 450. At step 450, the predictive application 212 may apply a saliency algorithm 216 to compute a saliency value for the video based on the saliency values for the pixels and/or frames. In at least one embodiment, the predictive application 212 may compute a "mean" saliency value for the video by computing the average (or mean) IKN value of each pixel in each frame. The predictive application 212 may further compute a standard deviation saliency value for the video based on the standard deviation of the saliency values of each pixel in each frame. Once computed, the predictive application 212 may provide the saliency value for the video as input to a predictive algorithm 217. In turn, the predictive algorithm 217 computes an expected value for a success metric of the video.

Figure 5:
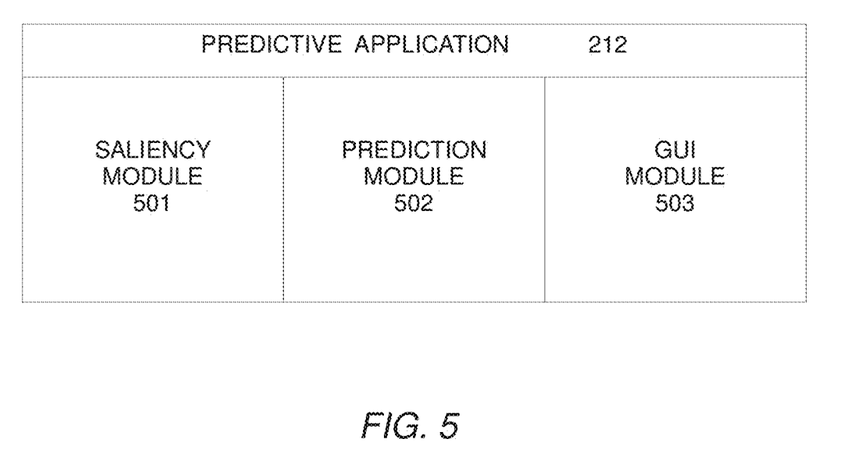
FIG. 5 is a block diagram illustrating components of a predictive application, according to one embodiment.

FIG. 5 is a block diagram illustrating components of the predictive application 212, according to one embodiment. As shown, the predictive application 212 includes the saliency module 501, the prediction module 502, and the graphical user interface (GUI) module 503. The saliency module 501 is generally configured to apply saliency algorithms 216 to the image data of a video 214, and compute per-pixel, per-frame, and per-video saliency values. The prediction module 502 is generally configured to apply a predictive algorithm 217 to the computed saliency value for a video, and generate an expected value for a specific success metric for the video. The UI module 503 is generally configured to provide the graphical user interface (UI) 260 and generate output for the user. The output may be a GUI that provides an indication of the expected metric value, such as a graph reflecting survival probabilities for each second of a video. Example outputs created by the GUI module 503 are depicted in FIGS. 1A-1B.

Advantageously, embodiments disclosed herein provide techniques to determine the success of a video for any number of metrics based on the saliency of the video. A saliency value of the video may be computed based on image data of the video. The saliency value may be provided as input to a predictive algorithm that computes an expected value for the success metric based on the saliency value. By receiving an indication of how successful their video may be before the video is published, users may modify their videos to ensure that the video has a greater likelihood of success relative to the success metric. For example, if the predictive application 212 returns an indication that a video is expected to receive 1,000 views (relative to an average of 10,000 views for each video in the videos 214), the user may modify the saliency of the video. The user may then provide the modified video to the predictive application 212, which may determine that the modified video is now expected to receive 100,000 views. The user may then determine to publish the modified video having higher saliency rather than the unmodified video having lower saliency, as the modified video is likely to be more successful once published.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the predictive application 212 could execute on a computing system in the cloud and predict the success of videos before the videos are published. In such a case, the predictive application 212 could compute expected success metric values and store the computed values at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
computing a saliency value for a video based on saliency values for a set of pixels in each frame of the video;
computing, for the video, an expected value for a metric by a predictive algorithm based on the saliency value for the video, wherein the metric comprises at least one of: (i) a number of views the video will receive, and (ii) a duration of the video a viewer will watch; and
outputting the expected value for the metric as an indication of an expected outcome for the metric achieved by the video.

2. The method of claim 1, wherein the saliency values for the sets of pixels comprise vectors specifying values for: (i) a color, (ii) a brightness, and (iii) an orientation of one or more pixels in each respective set of pixels, wherein computing the saliency value for the video comprises:
computing a vector sum of each of the vectors in each respective frame of the video;
computing a mean saliency value based on each of the vector sums for each frame of the video; and
computing a standard deviation of the vector sums of each of the vector sums for each frame of the video.

3. The method of claim 1, wherein the set of pixels comprises each pixel in each respective frame of the video, further comprising:
computing the saliency values for each of the plurality of pixels in each frame of the video based on the color, the brightness, and the orientation of each respective pixel; and
computing a saliency value for one or more frames of the video by aggregating each of the saliency values for each of the plurality of pixels in the respective frame of the video, wherein the saliency value for the video is further based on the saliency values for each frame of the video.

4. The method of claim 3, wherein the saliency value for each frame is further based on one or more of: (i) a number of faces in the frame, (ii) presence of text in the frame, (iii) a proximity of a feature in the frame to a center of the frame, (iv) whether the features is in motion across multiple frames, (v) whether an object exists in the foreground of the frame, (vi) whether the object is occluded by other objects in the frame, and (vii) a size of the set of pixels in the frame.

5. The method of claim 1, wherein the predictive algorithm is configured to receive the saliency value for the video as input and return the expected value as an output, wherein the predictive algorithm comprises at least one of: (i) a survivor function, (ii) a hazard function, (iii) a linear regression, (iv) a multiple regression, and (v) a machine learning model.

6. The method of claim 5, wherein the predictive algorithm is configured to output the expected value for the metric as a least one of: (i) a vector, and (ii) a value, wherein the metric further comprises at least one of: (i) a number of likes the video will receive, (ii) a number of viewers that will watch a second video promoted by the video, (iii) a likelihood that a viewer will click a link to an advertisement in the video, (iv) a likelihood that a viewer will stop watching the video at each second of the video, and (v) an expected amount of advertising revenue the video will generate.

7. The method of claim 1, wherein the set of pixels comprises a group of adjacent pixels in the frame, wherein the expected outcome is relative to historical outcomes for other videos, wherein a duration of the video is below a predefined time threshold.

8. A computer program product, comprising:
a non-transitory computer-readable storage medium having computer-readable program code embodied therewith, the computer-readable program code executable by a processor to perform an operation comprising:
computing a saliency value for a video based on saliency values for a set of pixels in each frame of the video;
computing, for the video, an expected value for a metric by a predictive algorithm based on the saliency value for the video, wherein the metric comprises at least one of: (i) a number of viewers that will watch a second video promoted by the video, and (ii) a likelihood that a viewer will click a link to an advertisement in the video; and
outputting the expected value for the metric as an indication of an expected outcome for the metric achieved by the video.

9. The computer program product of claim 8, wherein the saliency values for the sets of pixels comprise vectors specifying values for: (i) a color, (ii) a brightness, and (iii) an orientation of one or more pixels in each respective set of pixels, wherein computing the saliency value for the video comprises:
computing a vector sum of each of the vectors in each respective frame of the video;
computing a mean saliency value based on each of the vector sums for each frame of the video; and
computing a standard deviation of the vector sums of each of the vector sums for each frame of the video.

10. The computer program product of claim 8, wherein the set of pixels comprises each pixel in each respective frame of the video, the operation further comprising:
computing the saliency values for each pixel in each frame of the video; and
computing a saliency value for one or more frames of the video by aggregating each of the saliency values for each pixel in the respective frame of the video, wherein the saliency value for the video is further based on the saliency values for each frame of the video.

11. The computer program product of claim 10, wherein the saliency value for each frame is further based on one or more of: (i) a number of faces in the frame, (ii) presence of text in the frame, (iii) a proximity of a feature in the frame to a center of the frame, (iv) whether the features is in motion across multiple frames, (v) whether an object exists in the foreground of the frame, (vi) whether the object is occluded by other objects in the frame, and (vii) a size of the set of pixels in the frame.

12. The computer program product of claim 8, wherein the predictive algorithm is configured to receive the saliency value for the video as input and return the expected value as an output, wherein the predictive algorithm comprises at least one of: (i) a survivor function, (ii) a hazard function, (iii) a linear regression, (iv) a multiple regression, and (v) a machine learning model.

13. The computer program product of claim 12, wherein the predictive algorithm is configured to output the expected value for the metric as a least one of: (i) a vector, and (ii) a value, wherein the metric further comprises at least one of: (i) a number of views the video will receive, (ii) a number of likes the video will receive, (iii) a duration of the video a user will watch, (iv) a likelihood that a viewer will stop watching the video at each second of the video, and (v) an expected amount of advertising revenue the video will generate.

14. The computer program product of claim 8, wherein the expected outcome is relative to historical outcomes for other videos, wherein a duration of the video is below a predefined time threshold.

15. A system, comprising:
a processor; and
a memory containing a program which when executed by the processor performs an operation comprising:
computing a saliency value for a video based on saliency values for a set of pixels in each frame of the video;
computing, for the video, an expected value for a metric by a predictive algorithm based on the saliency value for the video, wherein the metric comprises at least one of: (i) an expected amount of advertising revenue the video will generate, and (ii) a likelihood that a viewer will stop watching the video at each second of the video; and
outputting the expected value for the metric as an indication of an expected outcome for the metric achieved by the video.

16. The system of claim 15, wherein the saliency values for the sets of pixels comprise vectors specifying values for: (i) a color, (ii) a brightness, and (iii) an orientation of one or more pixels in each respective set of pixels, wherein computing the saliency value for the video comprises:
computing a vector sum of each of the vectors in each respective frame of the video;
computing a mean saliency value based on each of the vector sums for each frame of the video; and
computing a standard deviation of the vector sums of each of the vector sums for each frame of the video.

17. The system of claim 15, wherein the set of pixels comprises each pixel in each respective frame of the video, the operation further comprising:
computing the saliency values for each pixel in each frame of the video; and
computing a saliency value for one or more frames of the video by aggregating each of the saliency values for each pixel in the respective frame of the video, wherein the saliency value for the video is further based on the saliency values for each frame of the video.

18. The system of claim 17, wherein the saliency value for each frame is further based on one or more of: (i) a number of faces in the frame, (ii) presence of text in the frame, (iii) a proximity of a feature in the frame to a center of the frame, (iv) whether the features is in motion across multiple frames, (v) whether an object exists in the foreground of the frame, (vi) whether the object is occluded by other objects in the frame, and (vii) a size of the set of pixels in the frame.

19. The system of claim 15, wherein the predictive algorithm is configured to receive the saliency value for the video as input and return the expected value as an output, wherein the predictive algorithm comprises at least one of: (i) a survivor function, (ii) a hazard function, (iii) a linear regression, (iv) a multiple regression, and (v) a machine learning model.

20. The system of claim 19, wherein the predictive algorithm is configured to output the expected value for the metric as a least one of: (i) a vector, and (ii) a value, wherein the metric further comprises at least one of: (i) a number of views the video will receive, (ii) a number of likes the video will receive, (iii) a duration of the video a user will watch, (iv) a number of viewers that will watch a second video promoted by the video, and (v) a likelihood that a viewer will click a link to an advertisement in the video.

* * * * *

UNITED STATES PATENT AND TRADEMARK OFFICE
CERTIFICATE OF CORRECTION

| | |
|---|---|
| PATENT NO. | : 9,911,202 B2 |
| APPLICATION NO. | : 14/834222 |
| DATED | : March 6, 2018 |
| INVENTOR(S) | : Seth Frey et al. |

It is certified that error appears in the above-identified patent and that said Letters Patent is hereby corrected as shown below:

In the Claims

In Column 12, Line 55, in Claim 6, delete "a" and insert -- at --, therefor. (First occurrence)

In Column 13, Line 57, in Claim 13, delete "a" and insert -- at --, therefor. (First occurrence)

In Column 14, Line 57, in Claim 20, delete "a" and insert -- at --, therefor. (First occurrence)

Signed and Sealed this
First Day of May, 2018

Andrei Iancu
*Director of the United States Patent and Trademark Office*